2 Sheets—Sheet 1.

T. ORTON.
Bill and Letter File.

No. 207,817. Patented Sept. 10, 1878.

Attest:
H. L. Perrine
Albin M. Long

Thomas Orton,
Inventor.
By H. L. Abbot.
Atty.

2 Sheets—Sheet 2.
T. ORTON.
Bill and Letter File.
No. 207,817. Patented Sept. 10, 1878.
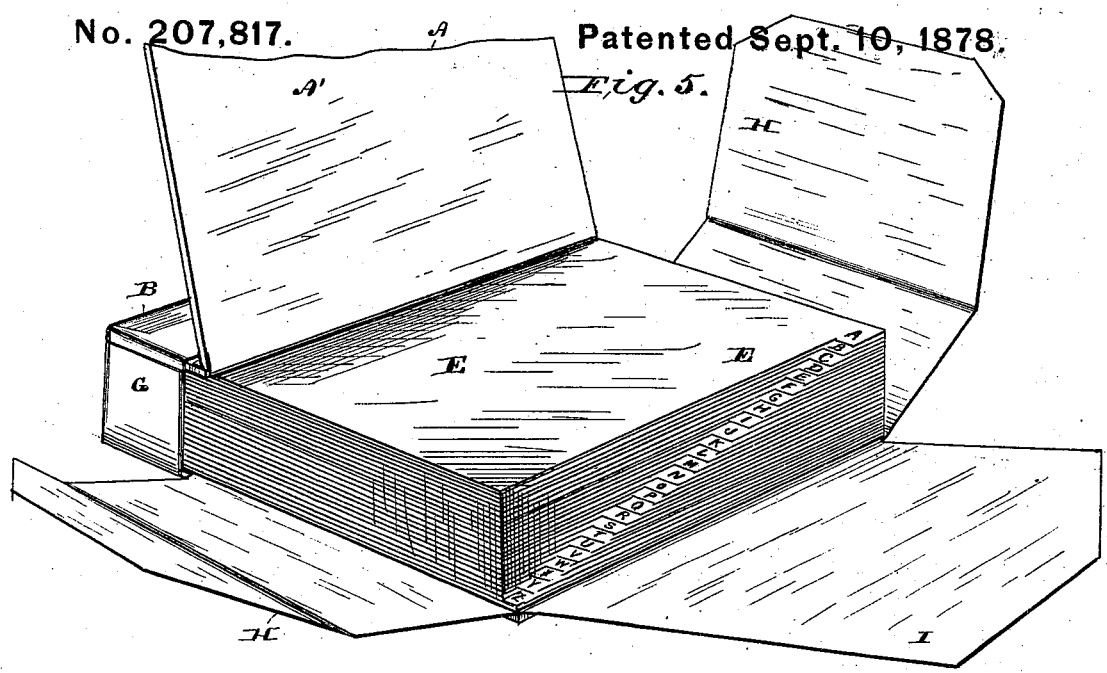
Fig. 5.
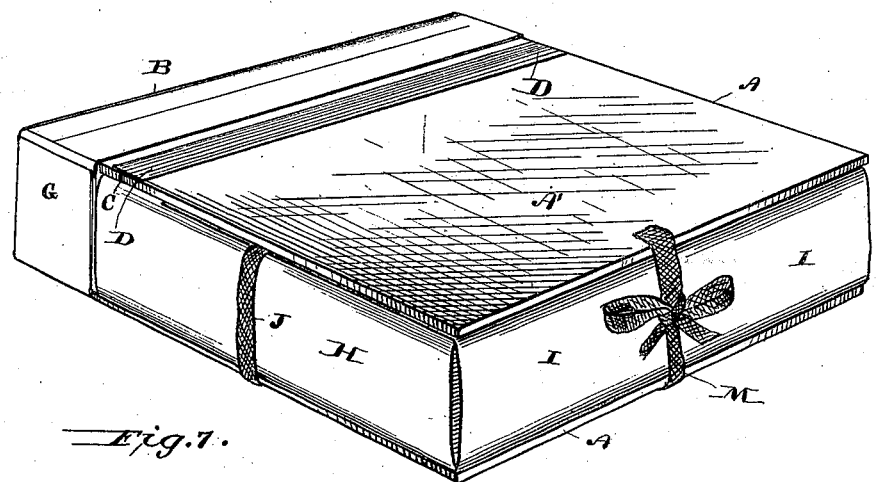
Fig. 6.
Fig. 7.
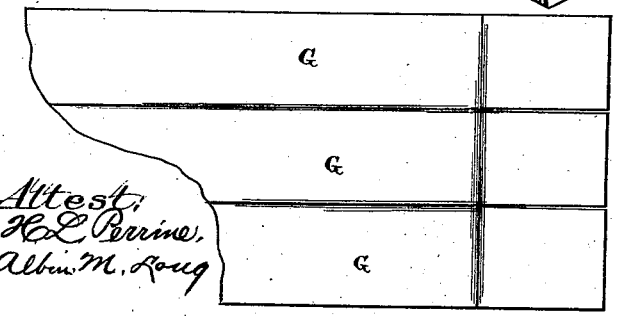
Attest:
H. L. Perrine,
Albin M. Long
Thomas Orton,
Inventor.
By H. J. Abbot,
Atty.

UNITED STATES PATENT OFFICE.

THOMAS ORTON, OF CHICAGO, ILLINOIS.

IMPROVEMENT IN BILL AND LETTER FILES.

Specification forming part of Letters Patent No. 207,817, dated September 10, 1878; application filed May 18, 1878.

*To all whom it may concern:*

Be it known that I, THOMAS ORTON, of Chicago, in the county of Cook and State of Illinois, have invented certain new and useful Improvements in Letter-Files; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
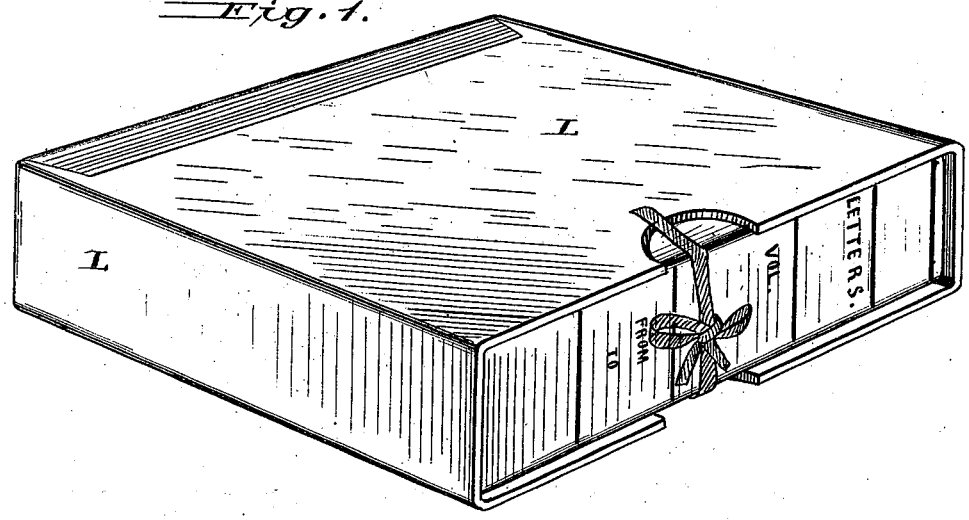
Figure 2:
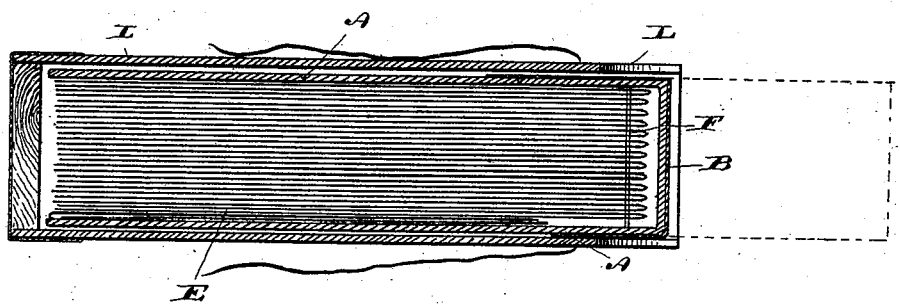
Figures 3, 4:
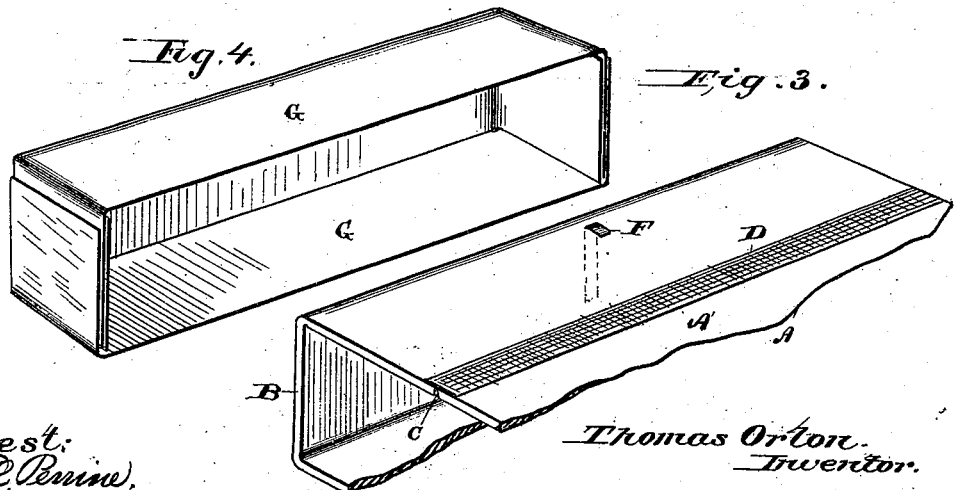

Figure 1 is a perspective view of the inclosing-case with the binding-folio in place. Fig. 2 is a central transverse section through the inclosing-case and binding-folio. Fig. 3 is a perspective view of the folio with the sides or upper and lower covers cut off near the back and upper cover provided with a flexible joint. Fig. 4 is a perspective view of the folio-back inclosure. Fig. 5 is a perspective view, with the upper cover of the folio raised, showing the index-leaves and the flaps for inclosing said index-leaves. Fig. 6 is a view, showing the index-leaves of the folio covered by the flaps after having been filled, and the upper cover of the folio tied down on top of the flaps; and Fig. 7 is a view of the inclosure for the folio-back spread out.

This invention is in the nature of an index letter-file, provided with adjustable indexed interleave inclosures, for the reception of letters or other papers, the indexed inclosures or leaves being covered by a folio, the upper side or cover of which is provided with a flexible joint. The folio is formed from one piece of book-board or stiff paper, its back being continuous—that is, formed by the two side covers.

The folio-back is covered by a short inclosure of stiff paper, the ends of which are slitted and glued down over the open ends of the back. The inside of the lower folio-cover is provided with suitable flaps for inclosing the index-leaves when they are filled and ready to be stored away, thereby keeping the contents thereof clean and free from accumulating dust.

When the folio is filled it is kept in a suitable case, constructed with an open side for the reception of the folio.

In the accompanying drawings, A represents the folio. This folio is formed in one piece, and made of any suitable book-board or stiff paper.

The back B being continuous, or formed by the upper and lower sides of the folio, the upper side, A', of the folio, a suitable distance from the back B, is provided with a flexible joint, C, which is strengthened or made secure by a strip of cloth, D, pasted on the outside of the joint, as shown in Figs. 3 and 6 of drawings.

Within the folio A is placed any desired number of index-leaves, E. These index-leaves are held in place by any suitable binding admitting of their vertical adjustment as they become filled with letters or other papers.

In Figs. 2 and 3 of drawings I have shown a wire, F, passing through a suitable perforation near the back or inner side of the leaves, also through the side of the folio. The wire may be secured by pressing or binding its projecting ends down on the folio, as shown in Fig. 3 of drawing.

The back of the folio A is inclosed by a strip of paper, G, having its ends slitted, as shown in Fig. 7 of drawing, which are bent down and glued, as shown in Fig. 4 of drawings, thereby closing the side openings to such distance from the back as to keep the index-leaves in proper position, as well as provide the back B with such additional stiffness and rigidity as will insure its conformation.

The lower or stiff side of the folio is provided with two side flaps, H, and a front flap, I. The object of these flaps is to protect or keep the index-leaves and their contents free from accumulated dust when the file is stored away or out of common use.

In covering the index-leaves the side flaps H are first folded over, the front flap I then folded over on top of the side flaps, and the whole secured by a tape, J, if desired. The flexible side H of the folio is then secured by tapes M on top of the flaps, as shown in Fig. 6 of drawing.

The folio, when packed or filled and ready to be stored away, is placed in a case, L, constructed of any suitable material, and formed with one of the sides open, as shown in Fig.

7 of drawing, in order to allow free passage of the folio when reference to its contents is desired to be made.

Tapes M may be used for holding the folio in place, if desired.

Having thus fully described my invention, what I claim as new, and desire to secure by Letters Patent, is—

1. The folio A, formed in one piece and provided with a flexible side, as set forth, having its back inclosed by a strip, G, as shown and described.

2. The folio A, formed in one piece, having its back inclosed by a strip, G, and provided with binding F, in combination with a series of index-leaves, E, as set forth.

3. The folio A, having its back inclosed by a strip, G, having a flexible side, and provided with flaps H I, as set forth.

In testimony that I claim the foregoing as my own I affix my signature in presence of two witnesses.

THOMAS ORTON.

Witnesses:
HUGH T. BIRCH,
JAS. S. DICKINSONE.